(12) United States Patent
Wintrich et al.

(10) Patent No.: US 8,019,446 B2
(45) Date of Patent: Sep. 13, 2011

(54) CONTROL LOOP FOR REGULATING A COMBUSTION PROCESS

(75) Inventors: Franz Wintrich, Essen (DE); Volker Stephan, Hupstedt (DE)

(73) Assignee: Powitec Intelligent Technologies GmbH, Essen (DE)

( * ) Notice: Subject to any disclaimer, the term of this patent is extended or adjusted under 35 U.S.C. 154(b) by 867 days.

(21) Appl. No.: 12/074,271

(22) Filed: Feb. 29, 2008

(65) Prior Publication Data

US 2008/0215165 A1 Sep. 4, 2008

(30) Foreign Application Priority Data

Mar. 1, 2007 (EP) ..................................... 07004214

(51) Int. Cl.
*G05B 13/02* (2006.01)
(52) U.S. Cl. ................ 700/29; 700/48; 700/49; 700/50; 706/15
(58) Field of Classification Search .................... 700/28, 700/29, 47, 48, 49, 50; 706/15
See application file for complete search history.

(56) References Cited

U.S. PATENT DOCUMENTS

| | | | |
|---|---|---|---|
| 5,249,954 A * | 10/1993 | Allen et al. ...................... | 431/14 |
| 6,468,069 B2 * | 10/2002 | Lemelson et al. ............... | 431/12 |
| 7,035,717 B2 | 4/2006 | Wintrich et al. | |
| 7,231,078 B2 | 6/2007 | Wintrich et al. | |
| 2002/0016640 A1 | 2/2002 | Gagne | |
| 2004/0044423 A1 | 3/2004 | Wintrich et al. | |
| 2004/0214123 A1 | 10/2004 | Schmidt et al. | |
| 2005/0137995 A1* | 6/2005 | Wintrich et al. ................ | 706/48 |
| 2005/0147288 A1 | 7/2005 | Wintrich et al. | |
| 2006/0024628 A1 | 2/2006 | Wintrich | |
| 2007/0250216 A1 | 10/2007 | Wintrich | |
| 2008/0046391 A1 | 2/2008 | Wintrich et al. | |

FOREIGN PATENT DOCUMENTS

| | | |
|---|---|---|
| EP | 1 364 164 B1 | 11/2003 |
| EP | 1 396 770 A1 | 3/2004 |
| EP | 1 621 813 A1 | 2/2006 |
| WO | WO 98/27474 | 6/1998 |
| WO | WO 02/070953 A1 | 9/2002 |
| WO | WO 02/077527 A1 | 10/2002 |
| WO | WO 2004/018940 A1 | 3/2004 |

OTHER PUBLICATIONS

U.S. Appl. No. 11/904,427; Filed: Sep. 27, 2007; in re: Franz Wintrich et al., entitled Regulating a Combustion Process.

* cited by examiner

*Primary Examiner* — Kidest Bahta
*Assistant Examiner* — Carlos Ortiz Rodriguez
(74) *Attorney, Agent, or Firm* — Womble Carlyle Sandridge & Rice, PLLC

(57) ABSTRACT

In a control loop for regulating a combustion process in a plant (e.g., a power-generating plant, a waste incineration plant or a cement works) having a controlled system for converting material by way of the combustion process while supplying air, with at least one flame body being formed, and having at least one observation device for imaging the flame body, other sensors for determining the input data, at least one adjustment device that can be controlled by output data for supplying at least material and/or air, and a computer for evaluating the input data in relation to target values and for determining the output data by using a current process model, the computer has a feature extraction module that extracts features from the input data using an information measure. The features are informative for the target values, and are for use in an alternative process model.

16 Claims, 2 Drawing Sheets

CONTROL LOOP FOR REGULATING A COMBUSTION PROCESS

CROSS-REFERENCE TO RELATED APPLICATION

The present application claims priority to EP 07 004 214.8, which was filed Mar. 1, 2007. The entire disclosure of EP 07 004 214.8 is incorporated herein by reference.

TECHNICAL FIELD

The present invention generally relates to a control loop for regulating a combustion process in a plant, for example, a power-generating plant, a waste incineration plant or a plant for making cement, with the plant having a controlled system for converting material by way of the combustion process while air is supplied and at least one flame is formed, wherein the control loop has at least one observation device for imaging the flame body, other sensors for determining input data, at least one adjustment device, which can be controlled by output data, for adjusting at least the supply of material and/or air, and a computer for evaluating the input data with regard to the target values and for determining the output data by using a current process model.

BACKGROUND

In a known control loop of the type described above, a process model having a defined structure is programmed into a computer, and the structure cannot be modified by human intervention except in exceptional circumstances. Therefore, there is a risk that informative input data are not taken into account, and also that computing power is used for processing non-informative input data.

The employment of a human expert to find a more suitable structure is prone to error and very costly. Data-driven compression approaches, such as Principal Components Analysis ("PCA"), ultimately do not reduce the amount of data but merely present the data in a different way so that no new structure results.

SUMMARY OF SOME ASPECTS OF THIS DISCLOSURE

An aspect of an exemplary embodiment of the present invention is the provision of a control loop that is at least generally of the type referred to above, and that further automatically develops improvements in the regulatory function. In a control loop for regulating a combustion process in a plant, with the plant having a controlled system for converting material by way of the combustion process while at least oxygen (e.g., air) is supplied to the combustion process and at least one flame is formed, the control loop may include: at least one observation device for imaging at least the flame; sensors for determining input data; at least one adjustment device for adjusting at least one supply selected from the group consisting of a supply of the material and the supply of at least oxygen (e.g., air), wherein the adjustment device can be controlled by output data; and at least one computer for evaluating at least the input data with regard to target values and for determining the output data by using a current process model. The computer may have a feature extraction module that is operative for extracting features at least from the input data by way of an information measure. The features that are extracted are informative for the target values. The features that are extracted are for an alternative process model. The feature extraction module may, in particular, operate alongside (e.g., simultaneously with) the normal regulation of the combustion process. The plant may be a power-generating plant, a waste incineration plant or a plant for making cement (cement works).

The feature extraction module extracts from at least the input data those features which are informative for the target values, so that by using an alternative process model, in particular a neuronal network, based thereon and having the simplest possible structure and in particular smaller dimensions, it is possible to predict future states more quickly and more accurately, and thus regulation can be effected more rapidly and in a more targeted manner. For this purpose, the feature extraction module, while taking into account the target values, searches for a filter by way of which the quantity of input data to be taken into account for the process model can be reduced, in order to continue using only the most informative features. This saves on computing power. In the competition between several process models this prevents the neuronal network from remaining in a local minimum. The information measure used for extraction purposes is calculated from various individual and combined probabilities and examined for its maximum. The most effective adjustment variables can be analogously selected, and the plant-specific properties can be taken into account in such a module in order to reduce the computer capacity required for the module which primarily applies the process model.

The invention can be used, for example, in various stationary thermodynamic plants, in particular in power stations, waste incineration plants and plants for making cement (cement works).

Other aspects and advantages of the present invention will become apparent from the following.

BRIEF DESCRIPTION OF THE DRAWINGS

In the following, the invention is described in detail on the basis of an exemplary embodiment depicted in the drawings, which are briefly described below.

DETAILED DESCRIPTION

Figure 1:
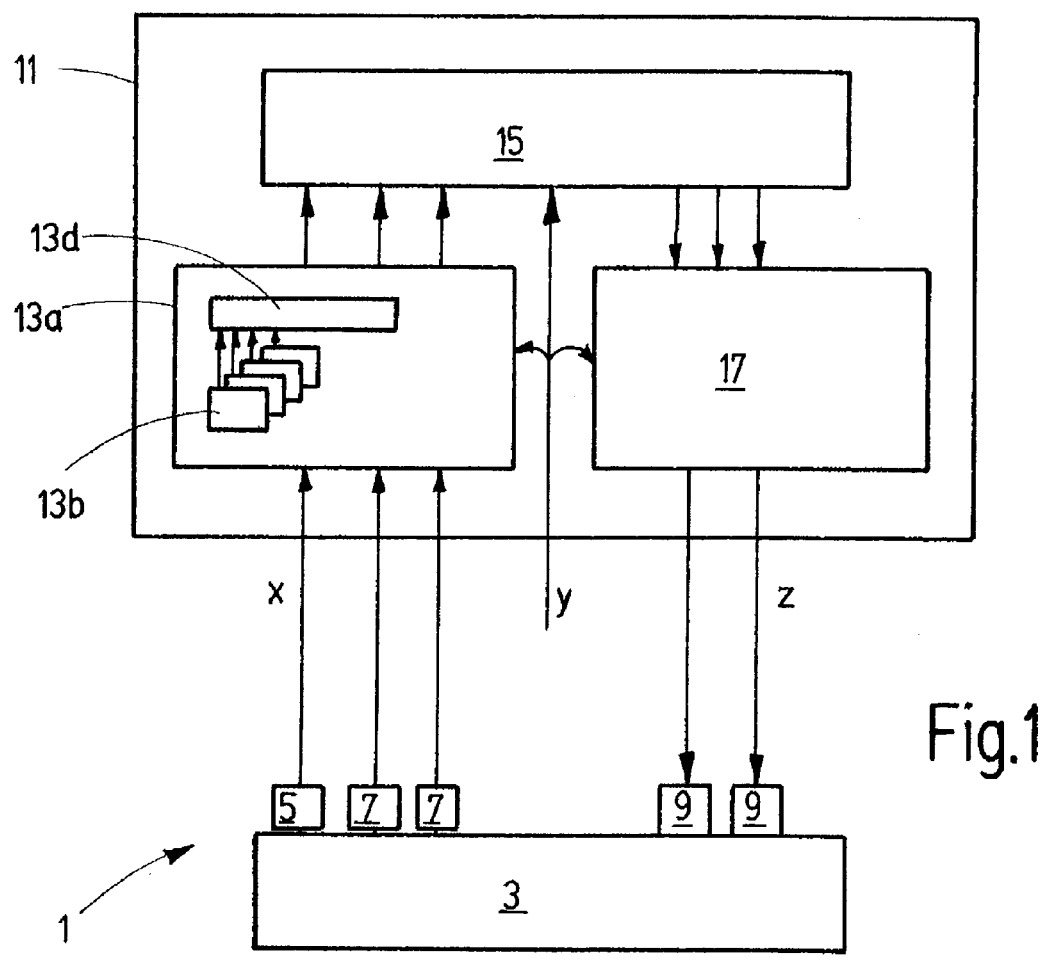
FIG. 1 a block circuit diagram of the plant and of the computer.
Figure 2:
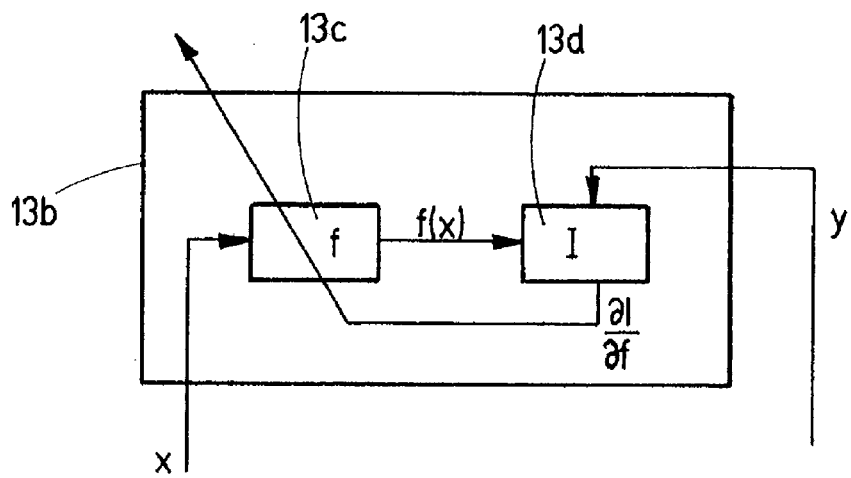
FIG. 2 a block circuit diagram of a feature extractor from FIG. 1.
Figure 3:
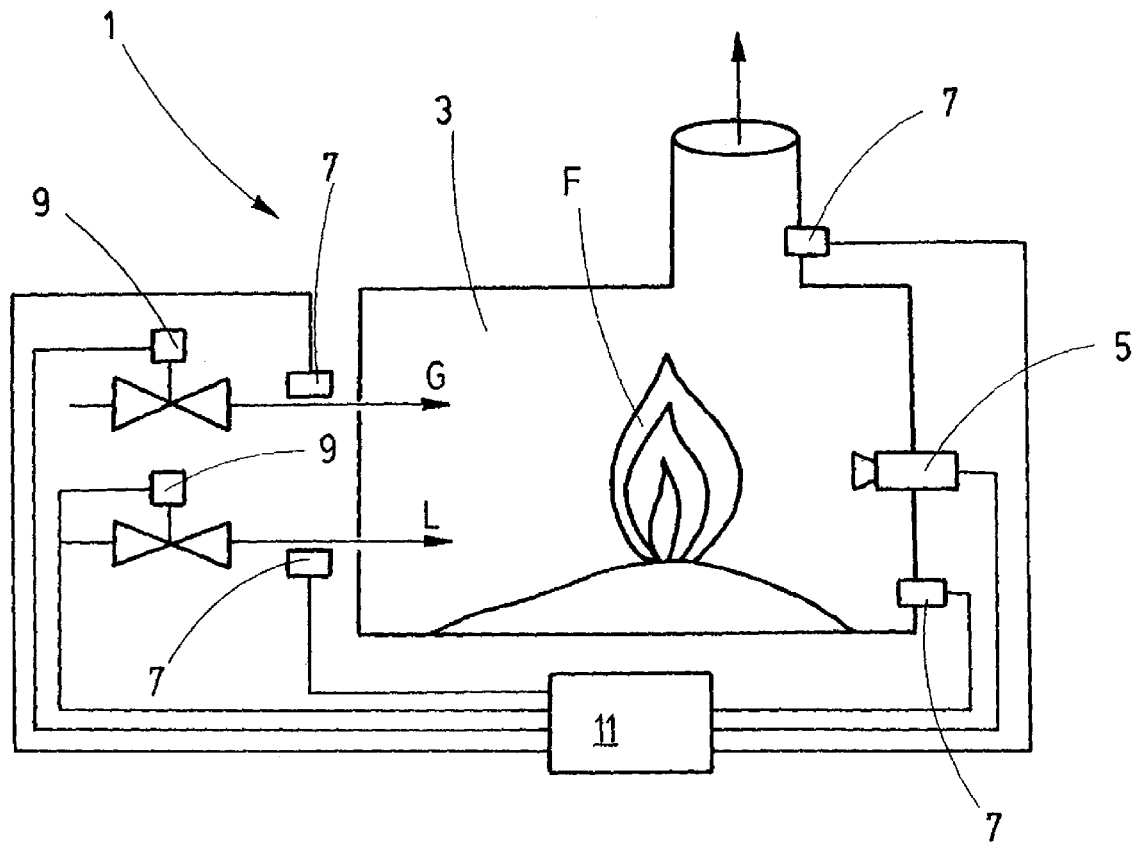
FIG. 3 a schematic drawing of a plant corresponding to FIG. 1.

A plant 1, for example a coal-fired, oil-fired or gas-fired power station, a waste incineration plant or a plant for making cement (cement works), comprises a furnace 3 (which should also be understood to mean a grate) at least one observation device 5 that can image (e.g., capture images of) the interior of the furnace 3 (or the grate), preferably further sensors 7, at least one adjustment device 9, and a computer 11 to which the observation device(s) 5, further sensors 7 and adjustment device(s) 9 are connected.

The furnace 3 is supplied with fuel or any other material to be converted, referred to for short as G, for example coal, oil, gas, waste, lime or similar materials, as well as primary air (or primary oxygen) and secondary air (or secondary oxygen), referred to in short as L, and this supply is regulated by the adjustment devices 9 that are controlled by the computer 11. A combustion process takes place in the furnace 3. At least one resulting flame body F that is generated (and possibly also the emissions from one or more of the walls of the furnace 3) is continuously monitored by the observation devices 5. The observation devices 5 comprise in each case not only an optical access penetrating the wall of the furnace 3, for example a lance or a device as disclosed in EP 1 621 813 A and/or US 2006/0024628 A1, but also a camera, or the like, operating in the optical range or in adjacent ranges of the electromagnetic wavelength spectrum. Preferably a camera with high temporal, local and spectral resolution should be used. For example, the camera may be of the type described in WO 02/070953 A1 and/or EP 1 364 164 B1.

The images of the flame body F (and optionally also of any possible emissions from the walls of the furnace 3) are evaluated in the computer 11, for example according to an eigenvalue method that is described in WO 2004/018940 A1 and/or U.S. Pat. No. 7,231,078 B2. The data obtained from the images of the flame body F, as well as the data from the other sensors 7, which measure for example the supply of the material G and the air L, pollutant concentrations in the waste gases, or the concentration of free lime (FCAO), are treated as state variables s(t) which (as a function of time) describe the state of the system in the plant 1 in general, and the combustion process in particular, and are to be considered a vector.

The furnace 3 as a (controlled) system, the observation device(s) 5 and the further sensors 7, the computer 11 and the adjustment devices 9 define a control loop. It is also possible to provide a conventional control loop comprising just a furnace 3, sensors 7, computer 11 and adjustment devices 9, but without the observation device(s) 5, and with the control function of the control loop taking account of just a few state variables $s_t$ (i.e. it is low-dimensional) and then being optimized by incorporating the observation device(s) 5. The system in the plant 1 can be regulated, for example, to achieve certain set-point values or to maintain a stable process (i.e. smooth, quasi-stationary operation of the plant 1). In both cases, the state described by the actual values of the state variables is evaluated and, if necessary, appropriate adjusting actions, referred to in short as "actions", are selected to be carried out by the adjustment devices 9. In addition to supplying material G and air L, other activities performed by the adjustment devices 9, and possibly also a sample-taking, may be considered an action within the meaning of the exemplary embodiment of the invention. Disturbances can also be treated as undesired actions. Adjustable combinations of the two aforementioned control cases are conceivable; they then represent compromises.

The evaluation of the state and the selection of the appropriate actions can, for example, be carried out according to a process such as that described in WO 02/077527 A1 and/or U.S. Pat. No. 7,035,717 B2. At least one neuronal network is implemented in the computer 11, and acting as a process model this neuronal network stores the reactions of the system states to actions, i.e. the (non-linear) links between the values of the state variables at a certain point in time and the actions then taken, on the one hand, and the resulting values of the state variables at a later point in time (i.e. later by a certain interval of time), on the other hand, at as many points in time as possible in the past. In this sense, disturbances can also be included in the process model as (undesired) actions. A situational evaluation, which is conceived of as (e.g., can be characterized as) a simplified quality and is independent of the process model, i.e. the stored links, evaluates the values of the state variables for a certain point in time and with respect to given optimization targets, i.e. with respect to determining how close the system state is to the optimum state at this point in time. By evaluating a predicted state—predicted using the process model as a function of a certain action—at a future point in time, it is possible to determine the suitability of the specific action for approaching the optimization target.

In order to improve the accuracy, not only are the process models continuously updated by the actual developments of the state variables as a reaction to actions, but there is also competition between several process models regarding the quality of the predictions. For this purpose, alternative process models are developed and trained in the background, for example with other topologies, and their predictions are compared with the currently used process model(s) in order if necessary to replace the currently used process model(s), as is described, for example, in EP 1 396 770 A1 and/or US 2005/0137995 A1.

A process model that is supposed to arrive at usable predictions in real time does not take account of all the available state variables. According to the exemplary embodiment of the invention, the information-bearing features are extracted from the existing data stream from the input channels, i.e. the observation devices 5 and the other sensors 7, in order to create therefrom a differently structured process model, i.e. an alternative process model with a different topology of the neuronal network, which is based on the extracted information-bearing features and thus on the most relevant state variables.

The computer 11 is organized in such a way that the raw data from the input channels, which is referred to in short in the following as input data x, is first input into a feature extraction module 13 of the computer 11 which inputs the input data x, filtered or unfiltered online, i.e. in real time, into an action generator module 15 of the computer 11. In the action generator module 15 are implemented the current process model and, if applicable, the alternative process models which, as already mentioned, are competing in the background with each other and with the current process model with regard to the predictions.

Based on the optimization goals, the action generator module 15 evaluates the status of the system as described by the unfiltered or filtered input data x and, with the aid of the current process model, makes predictions about the status of the system at a future point in time, as a function of various actions. Initially, actions which are still general and are suitable for approaching the optimization target, are output to the adjustment variable selection module 17 of the computer 11. The adjustment variable selection module 17 selects the concrete (e.g., specific) actions that are to be undertaken and transmits this selection of adjustment variable values as output data z to the adjustment devices 9. The adjustment devices 9 execute the selected actions on the basis of the output data that are received. The computer 11 with the components (e.g., software modules) 13, 15 and 17 mentioned above does not need to be a single unit but instead its tasks may be also be divided up among separate computers that are networked with each other.

In order to determine the aforementioned information-bearing features, the feature extractor module 13 contains various feature extractors 13a, for example one for each optimization target or target value y. The feature extractors 13a operate alongside (e.g., simultaneously with) the normal regulation process, i.e. preferably in the background or offline. Each feature extractor 13a takes the unfiltered input data x, which is typically in the form of a vector, and filters them in a filter unit 13b using a filter f. The filter f is a linear combination of the various input data x (at a particular time) with specially selected coefficients, and can thus be a scalar, a two-dimensional object (e.g. a time-dependent spectrum), or a three-dimensional object (e.g. a time-dependent image). The filtered input data or features f(x) are transmitted together with a target value y, for example the concentrations of a certain pollutant, to an evaluator unit 13c, which determines an information measure I.

In the simplest case, such an information measure I or entropy is a "mutual information" that is derived from the individual probabilities p(x) of the input data x and p(y) of the target value and from the combined probability p(x,y) as:

$$I=p(x,y,f)\log_2 [p(x,y,f)/(p(x,f)p(y))]$$

The evaluator unit 13c searches as a function of the filter f for a maximum of the information measure, i.e. $\partial I/\partial f=0$, by way of which the filter f, i.e. preferably the coefficients of the linear combination, is modified in the filter unit 13b. Iteratively, the filter f is then determined which extracts the informative features f(x) for the selected target value y from the input data x. These informative features f(x) are those which, of all the input data x, can contribute the maximum amount of information to describe the actual optimization targets, namely the target values y. In the most favorable case, so many coefficients of the filter f are zero or can be ignored that, ultimately, only a few input data x have to be taken into consideration.

The results of the individual feature extractors 13a are supplied to a feature selector 13d which determines joint mutual informations JMI for all the (filtered) input data $x_1$, $x_2$, ..., i.e. features and target values y, the JMI being derived analogously to the simple information measure I from single probabilities and combined probabilities as:

$$JMI=p(x_1,x_2,\ldots,y)\log_2 [p(x_1,x_2,\ldots,y)/(p(x_1,x_2,\ldots)p(y))]$$

The feature selector 13d now searches the various joint mutual informations JMI for the maximum, i.e. that combination of informative features that forms the most informative set of features. In the process, redundant features are suppressed and any information-bearing combinations which are found are retained. A combination of the individual filters f, i.e. a combined filter, corresponds to this most informative set of features. The feature selector 13d also works preferably in the background or offline. In an assumed case of a camera image as input data x, which is normally evaluated only in a partial region of interest (ROI), and assuming also an enlargement or displacement of the flame F away from the burner, the feature extraction module 13 can, for example, determine that the filter f that is found—deviating from the ROI—takes into account mainly areas located further away from the burner, so that it would be recommendable to relocate the ROI.

The most informative set of features or the combined filters found by the self-organized and automatically operating feature extractor module 13 contains structural information for the neuronal network that is to be used, and this structural information is passed on to the action generator module 15. The action generator module 15, which is also self-organized and operates automatically, generates a new process model from this structural information. In the most favorable case, so many coefficients of the combined filter are zero or can be ignored that, ultimately, only a few input data x need to be taken into account. The new process model is trained and competes with the other process models. As soon as the new process model replaces the current process model as a result of this competition, the computing power is more efficiently used and thus the control loop is more rapidly and/or more accurately operated.

The adjustment variable selection module 17 is preferably organized in such a way that, alongside normal regulation, i.e. preferably in the background, it searches for combinations of adjustment variables that have the strongest and clearest possible influence on the target values y. For this purpose—analogous to the feature extraction module 13—the possible actions are tested for their effect with regard to the target values y, and this is done by creating an information measure I or—in case of combinations—a JMI. The most effective adjustment variables are determined by searching for the maxima. Ineffective and ambiguous adjustment variables are eliminated. This also ensures more rapid and/or more accurate operation of the control loop. The concrete (e.g., specific) values of the most effective adjustment variables form the output data z which are transmitted to the adjustment devices 9 for controlling the adjustment devices 9. If the plant 1 has a process control system that supplies input data x from the sensors 7 to the computer 11, and receives output data z for controlling the adjustment devices 9, the adjustment variable selection module 17 supplies the output data z to the process control system.

The adjustment variable selection module 17 must be actively operated in order to verify from time to time the effect of the individual adjustment variables and, if necessary, to update it. The adjustment variable selection module 17 relieves the load on the action generator module 15 by modeling the plant-specific behavior of the adjustment variables; thus the action generator module 15 only has to provide simpler and more generally defined actions, i.e. the adjustment variable selector module 17 undertakes the actual implementation.

The task of the self-organized and automatically operating action generator module 15 is then to develop in a self-organized fashion an optimal action strategy that implements the goals of the operator of the plant 1. More complex problems may be broken down in a self-organized fashion into simpler sub-problems.

Generally described and in accordance with the exemplary embodiment of the present invention, the computer 11 (which includes appropriate input and output devices, a processor, memory, etc.) may control the operation of the plant 1 by virtue of receiving data from and providing data (e.g., instructions from the execution of software modules stored in memory) to respective components 5, 7, 9. For this purpose and in accordance with the exemplary embodiment of the present invention, the computer 11 typically includes or is otherwise associated with one or more computer-readable mediums (e.g., volatile memory and/or nonvolatile memory and/or one or more other storage devices such as, but not limited to, tapes and hard disks such as floppy disks and compact disks) having computer-executable instructions (e.g., one or more software modules or the like), with the computer handling (e.g., processing) the data in the manner indicated by the computer-executable instructions. Accordingly, the computer 11 can be characterized as being schematically illustrative of the computer-readable mediums, computer-executable instructions and other features of methods and systems of the exemplary embodiment of the present invention.

The entire disclosure of each of EP 1 621 813 A; US 2006/0024628 A1; WO 02/070953 A1; EP 1 364 164 B1; WO 2004/018940 A1; U.S. Pat. No. 7,231,078 B2; WO 02/077527 A1; U.S. Pat. No. 7,035,717 B2; EP 1 396 770 A1; and US 2005/0137995 A1 is incorporated herein by reference.

It will be understood by those skilled in the art that while the present invention has been discussed above with reference to an exemplary embodiment, various additions, modifications and changes can be made thereto without departing from the spirit and scope of the invention as set forth in the claims.

We claim:

1. A control loop for regulating a combustion process in a plant, wherein the plant has a controlled system for converting material by way of the combustion process while at least one flame is formed and at least oxygen is supplied to the combustion, the control loop comprising:
   at least one observation device for imaging at least the flame;
   sensors for determining input data; wherein the sensors include the at least one observation device, and the input data comprises data from the imaging; at least one adjustment device for adjusting at least one supply selected from the group consisting of a supply of the material and the supply of at least oxygen, wherein the adjustment device is for being controlled by output data; and
   at least one computer for evaluating at least the input data with regard to target values and for determining the output data by using a current process model,
   wherein the computer has a feature extraction module, the feature extraction module is for extracting features from at least the input data by way of an information measure, the features are informative for the target values, and the features are for an alternative process model;
   wherein the computer generates the alternative process model using at least the feature extraction module; the feature extraction module has a feature extractor for each target value, and each feature extractor filters at least the input data in a filter unit by way of a filter, in order to obtain the features;
   the feature extraction module includes an evaluation unit;
   the evaluation unit generates the information measure from the features and the target values; and
   the evaluation unit searches for a maximum of the information measure with regard to the filter.

2. The control loop according to claim 1, wherein the feature extraction module iteratively searches for the filter for which the information measure has a maximum.

3. The control loop according to claim 1, wherein:
   the computer has an action generator module; and
   as part of normal regulation of the combustion process, the action generator module uses the current process model to determine from at least the input data suitable general actions for approaching the target values.

4. The control loop according to claim 3, wherein:
   the computer has an adjustment variable selection module; and
   the adjustment variable selection module defines the output data by selecting specific actions.

5. The control loop according to claim 4, wherein the adjustment variable selection module selects, by way of an information measure, the most effective actions for the target values.

6. The control loop according to claim 1, wherein the plant is a power-generating plant, a waste incineration plant or a plant for making cement.

7. The control loop according to claim 1, wherein the computer is configured so that operation of the feature extraction module occurs alongside normal regulation of the combustion process.

8. A control loop for regulating a combustion process in a plant, wherein the plant has a controlled system for converting material by way of the combustion process while at least one flame is formed and at least oxygen is supplied to the combustion, the control loop comprising:
   at least one observation device for imaging at least the flame;
   sensors for determining input data; wherein the sensors include the at least one observation device, and the input data comprises data from the imaging; at least one adjustment device for adjusting at least one supply selected from the group consisting of a supply of the material and the supply of at least oxygen, wherein the adjustment device is for being controlled by output data; and
   at least one computer for evaluating at least the input data with regard to target values and for determining the output data by using a current process model,
   wherein the computer has a feature extraction module, the feature extraction module is for extracting features from at least the input data by way of an information measure, the features are informative for the target values, and the features are for an alternative process model;
   wherein the computer generates the alternative process model using at least the feature extraction module; the feature extraction module has a feature selector;
   the feature selector generates combined information measures for the features and target values; and
   the feature selector searches for a maximum of the information measures with regard to the combination.

9. The control loop according to claim 8, wherein the computer defines a structure of the alternative process model using the combination of the most informative features.

10. The control loop according to claim 9, wherein:
    the computer includes an action generator module; and
    the action generator module defines the structure of the alternative process model using the combination of the most informative features.

11. A method at least for preparing a process model for a control loop that is for regulating a combustion process in a plant, wherein the plant has a controlled system for converting material by way of the combustion process while at least oxygen is supplied and at least one flame is formed, the method comprising:
   using a current process model to provide output data for at least one adjustment device that is for adjusting at least one supply selected from the group consisting of a supply of the material and the supply of at least oxygen, wherein the using of the current process model includes
      (a) receiving input data at least from sensors, with the sensors including at least one observation device for imaging at least the flame, and
      (b) determining the output data, wherein the determining of the output data comprises evaluating the input data with regard to target values using at least one computer and the current process model, and the computer includes
         an action generator module that uses the current process model to determine from the input data suitable general actions for approaching the target values, and
         an adjustment variable selection module that defines the output data by selecting specific actions; and
   generating an alternative process model, wherein the generating of the alternative process model includes using the computer for extracting features from the input data by way of an information measure, wherein the computer includes a feature extraction module that extracts the features from the input data by way of the information measure, the features are informative for the target values, and the features are used in the generating of the alternative process model, and wherein each of the feature extraction module, the action generator module and the adjustment variable selection module is self-organized and operates automatically.

12. The method according to claim 11, wherein the using of the current process model and the generating of the alternative process model occur simultaneously.

13. The method according to claim 11, wherein:
the feature extraction module has a feature extractor for each target value, and each feature extractor filters the input data in a filter unit by way of a filter, in order to obtain the features;
the feature extraction module includes an evaluation unit;
the evaluation unit generates the information measure from the features and the target values; and
the evaluation unit searches for a maximum of the information measure with regard to the filter.

14. The control loop according to claim 13, wherein the feature extraction module iteratively searches for the filter for which the information measure has a maximum.

15. The method according to claim 11, wherein:
the feature extraction module has a feature selector;
the feature selector generates combined information measures for the features and target values; and
the feature selector searches for a maximum of the information measures with regard to the combination.

16. The method according to claim 15, wherein the computer defines a structure of the alternative process model using the combination of the most informative features.

* * * * *